United States Patent
Hell

(10) Patent No.: US 10,682,918 B2
(45) Date of Patent: Jun. 16, 2020

(54) CHARGING STATION FOR ELECTRIC VEHICLES AS WELL AS INTERFACE DEVICE IN SUCH A CHARGING STATION AND METHOD FOR OPERATING A CHARGING STATION

(71) Applicant: Stephan Hell, Duisburg (DE)

(72) Inventor: Stephan Hell, Duisburg (DE)

(73) Assignee: innogy SE, Essen (DE)

( * ) Notice: Subject to any disclaimer, the term of this patent is extended or adjusted under 35 U.S.C. 154(b) by 102 days.

(21) Appl. No.: 15/899,089

(22) Filed: Feb. 19, 2018

(65) Prior Publication Data

US 2018/0170204 A1 Jun. 21, 2018

Related U.S. Application Data

(63) Continuation of application No. PCT/EP2016/062400, filed on Jun. 1, 2016.

(30) Foreign Application Priority Data

Aug. 20, 2015 (DE) .......................... 10 2015 113 799

(51) Int. Cl.
*H02J 7/00* (2006.01)
*B60L 11/18* (2006.01)
(Continued)

(52) U.S. Cl.
CPC .......... *B60L 11/1848* (2013.01); *B60L 53/305* (2019.02); *B60L 53/60* (2019.02);
(Continued)

(58) Field of Classification Search
CPC ...... B60L 11/1848; B60L 53/60; B60L 53/68; B60L 53/305; B60L 53/665; G06Q 50/06;
(Continued)

(56) References Cited

U.S. PATENT DOCUMENTS

| | | | |
|---|---|---|---|
| 2005/0012639 A1* | 1/2005 | Smit | G01D 4/004 |
| | | | 340/870.02 |
| 2008/0272933 A1* | 11/2008 | Cahill-O'Brien | G01D 4/006 |
| | | | 340/870.02 |

(Continued)

FOREIGN PATENT DOCUMENTS

| | | |
|---|---|---|
| CA | 2 995 734 A1 | 2/2017 |
| CN | 108973740 A | 12/2018 |

(Continued)

OTHER PUBLICATIONS

A. Rodriguez-Serrano et al., A communication system from EV to EV Service Provider based on OCPP over a wireless network, IECON 2013—39TH Annual Conference of the IEEE Industrial Electronics Society, IEEE, Nov. 10, 2013, 5 pages, Department of Electronic Engineering, University of Seville, XP032538698, ISSN: 1553-572X.

*Primary Examiner* — Arun C Williams
(74) *Attorney, Agent, or Firm* — Reinhart Boerner Van Deuren P.C.

(57) ABSTRACT

Provided is a charging station for electric vehicles. The charging station includes a charge control circuit designed to control a charging process of an electric vehicle at the charging station, a communication module having a charge control interface designed for communication with the charge control circuit, and an operator interface designed for communication with a control centre external to the charging station. A first protocol is implemented in the operator interface for communication with the control centre. Improved interoperability is ensured by providing an interface device arranged at the operator interface in the charging station. This interface device communicates with the operator interface by means of the first protocol and with the (Continued)

external control centre by means of a second protocol which is different from the first protocol.

11 Claims, 5 Drawing Sheets

(51) Int. Cl.
*H04Q 9/00* (2006.01)
*B60L 53/60* (2019.01)
*B60L 53/68* (2019.01)
*B60L 53/66* (2019.01)
*B60L 53/30* (2019.01)
*G06Q 50/06* (2012.01)
*G07F 15/00* (2006.01)

(52) U.S. Cl.
CPC ............. *B60L 53/665* (2019.02); *B60L 53/68* (2019.02); *G06Q 50/06* (2013.01); *G07F 15/005* (2013.01); *H02J 7/0027* (2013.01); *H04Q 9/00* (2013.01); *H04Q 2209/40* (2013.01); *Y02T 10/7005* (2013.01); *Y02T 10/7072* (2013.01); *Y02T 90/121* (2013.01); *Y02T 90/128* (2013.01); *Y02T 90/14* (2013.01); *Y02T 90/16* (2013.01); *Y02T 90/163* (2013.01)

(58) Field of Classification Search
CPC ........ G07F 15/005; H02J 7/0027; H04Q 9/00; H04Q 2209/40; Y02T 10/7005; Y02T 10/7072; Y02T 90/121; Y02T 90/128; Y02T 90/14; Y02T 90/16; Y02T 90/163
See application file for complete search history.

(56) References Cited

U.S. PATENT DOCUMENTS

| | | | |
|---|---|---|---|
| 2008/0281663 A1* | 11/2008 | Hakim | ................. B60L 53/665 |
| | | | 705/7.25 |
| 2013/0338824 A1 | 12/2013 | Becker | |
| 2014/0062401 A1 | 3/2014 | Gadh et al. | |
| 2015/0224890 A1 | 8/2015 | Kim et al. | |
| 2016/0144728 A1* | 5/2016 | Harper | ................... B60L 53/68 |
| | | | 320/109 |
| 2018/0170204 A1 | 6/2018 | Hell | |
| 2018/0241228 A1* | 8/2018 | Kemppainen | ....... H02J 13/0089 |

FOREIGN PATENT DOCUMENTS

| | | |
|---|---|---|
| DE | 10 2009 008 957 A1 | 8/2010 |
| DE | 10 2009 030 090 A1 | 1/2011 |
| DE | 10 2010 034 629 A1 | 2/2012 |
| DE | 10 2011 106 106 A1 | 12/2012 |
| DE | 10 2011 110 217 A1 | 2/2013 |
| DE | 10 2013 000 981 A1 | 7/2014 |
| EP | 2 426 867 A1 | 3/2012 |
| EP | 2 919 174 A1 | 9/2015 |
| WO | WO 2012/107132 A1 | 8/2012 |
| WO | WO 2017/028975 A1 | 2/2017 |

* cited by examiner

| P₁ | P₂ |
|----|----|
| A  | B  |
| A' | B  |
| A''| B  |
| A₂ | B  |

CHARGING STATION FOR ELECTRIC VEHICLES AS WELL AS INTERFACE DEVICE IN SUCH A CHARGING STATION AND METHOD FOR OPERATING A CHARGING STATION

CROSS-REFERENCE TO RELATED PATENT APPLICATIONS

This patent application is a continuation of PCT/EP2016/062400, filed Jun. 1, 2016, which claims priority to German Application No. 10 2015 113 799.2, filed Aug. 20, 2015, the entire teachings and disclosure of which are incorporated herein by reference thereto.

FIELD OF INVENTION

The subject matter relates to a charging station for electric vehicles. The subject matter further relates to an interface device in such a charging station and to a method for operating a charging device.

BACKGROUND OF INVENTION

These days, charging stations communicate with a control centre via a data connection. Such a control centre forms a so-called back end, by means of which charging processes can be started and stopped with the charging station via the data connection. In addition, fault analyses and remote maintenance can be carried out in the charging stations via the back end.

As part of setting up a charging infrastructure, initially a proprietary protocol is implemented by each provider of charging stations. The protocol implementation is such that the charging station communicates with the back end via the corresponding protocol and can control charging processes via this. In addition, the protocols enable remote maintenance and fault analysis as well the activation of customers. Furthermore, some protocols are also compliant with calibration regulations such that measurement data can also be securely transmitted from the charging station to the back end.

However, due to the progressive expansion of the charging infrastructure, there is a requirement for standardising the communication between charging stations and back end systems. The problem is, however, that there is still no sufficiently specified protocol which ensures standardised communication between charging stations or charge controllers of different producers with back end systems. There is a further problem that as a result of the distributed infrastructure an exchange of communication modules, which are installed in the charging stations for communication with back end systems, is extremely complex.

For this reason the subject matter was based on the object of improving the interoperability between charging stations and back end systems.

BRIEF SUMMARY OF THE INVENTION

This object is solved by a charging station, an interface device, and a method as described herein.

Firstly, it can be noted that a charge control circuit, for example a charge controller, is always arranged in the charging station. This charge control circuit is designed to negotiate a charging process with a charge control circuit which is assigned to a vehicle. The process of charging an energy storage of an electric vehicle can be monitored in the charging station by means of the charge control circuit.

In addition, the charge control circuit together with suitable measurement devices (meters) can record consumption amounts and provide them for billing purposes.

A charging station usually also has a communication module for communication with a back end system. On the one hand, a communication module has at least one charge control interface. The communication module communicates with the charge control circuit via this charge control interface and where appropriate with measurement devices within the charging station, in order to control the charging process according to the specifications from the back end and record information with regard to the charging process. Hence, the charge control interface is designed for communication with at least the charge control circuit.

On the other hand, the communication module has an operator interface. This operator interface is designed to establish the communication between the charging station and the back end via the data network. By means of the operator interface, the communication module receives information from the back end and outputs information about the charging process for the back end. Hence, the operator interface is arranged for communication with a control centre which is spatially remote from the charging station.

As already explained, each operator of a charging station has preferably established a protocol which is suitable for it. This protocol is implemented in the operator interface of the communication module, so that the operator interface operates in compliance with the respective control centre. The commands and signals which are exchanged between the operator interface and the control centre are specified according to this first protocol.

It has now been recognised that interoperability between different charging stations and back end systems in charging infrastructures which already exist can only be achieved with an acceptable amount of technical effort by providing an interface device which is arranged at the operator interface in the charging station. The interface device is preferably connected between the operator interface and the control centre and arranged within the charging station or at the charging station. The interface device communicates with the operator interface by means of the first protocol. Therefore, for the operator interface, the interface device serves as the control centre. For the operator interface, the interface device is transparent, i.e. the operator interface does not recognise that the interface device has been provided between it and the control centre.

On the other hand, the interface device is designed for communication with the control centre by means of a second protocol which is different from the first protocol. The interface device converts the signals and information which are exchanged with the operator interface into signals and information which are exchanged with the control centre. Here, a protocol conversion is carried out which can be adapted to the respective circumstances in a charging station or in a back end system. For the control centre, the interface device is also transparent. The control centre also does not detect that the interface device is provided in the charging station, but rather the control centre communicates with the charging station using the second protocol implemented in the control centre without having to pay heed to which first protocol is implemented through the communication module in the charging station.

Therefore, the interface device ensures that charging stations of various producers having various protocols can communicate with a back end system, and vice versa.

According to one embodiment, it is proposed that the interface device has at least two sets of protocol parameters. A protocol can in particular be characterised by the fact that certain commands are sent at certain times. The timing and the designations of the commands, as well as the data structure of the command headers and of the command payloads can be stored in a set of parameters. At least two sets of protocol parameters can now be provided in the interface device. Two different first or second protocols can be represented in the interface device by means of these two sets of protocol parameters.

An interface device can be multifunctional if it can communicate with different operator interfaces. In order to already make this multifunctionality available at the time of delivery of an interface device, the sets of protocol parameters can be set up for the first protocol. Thus, with two sets of protocol parameters the interface device can communicate with two different operator interfaces. The selection of the operator interface can, for example, take place automatically, in which the operator interface signifies during the first communication with the interface device based on the type of signal which protocol it has implemented. In the interface device it can be determined from the signal received by the interface device which of the two sets of protocol parameters is suitable and the subsequent communication can be carried out based on a selected first of the at least two sets of protocol parameters.

On the other hand, it may also be required that a charging station should be able to communicate with different back end systems. This can, for example, make sense when a charging station is to have a multi-operator capability, i.e. an installed charging station can be operated by different operators. Depending on which protocol the operator has implemented, the respective back end system talks to the charging station via the corresponding protocol. A set of protocol parameters can also be stored for this purpose in the interface device respectively one of the second protocols and at least two sets of protocol parameters can be provided in the interface device.

In particular, it can be possible to alter existing sets of protocol parameters and also store new sets of protocol parameters. As a result, retrospectively, in particular by means of remote maintenance, a new set of protocol parameters can be loaded into the interface device, so that it can subsequently interact with new hardware inside the charging station, in particular with altered operator interfaces or with new back end systems.

In order to be able to load new sets of protocol parameters into the interface device, it is proposed that the interface device is arranged to receive a set of protocol parameters, in particular from the control centre.

By this means, a charging station can, for example, be adapted in such a way that it can be operated by a new charging station operator with a different back end system than the previous one. A manual exchange of hardware within the charging station can be dispensed with. It is also not necessary to send a technician to the charging station to configure the charging station for the new back end system.

On the other hand, a so-called "white label" interface device can be provided. No protocol parameters are stored in it. It can be installed in charging stations of various producers, in particular with various operator interfaces. The interface device can then be correspondingly programmed depending on the respectively implemented operator interface.

It should also be mentioned in this connection that the interface device can also where appropriate operate like a communication tunnel. The interface device can receive a corresponding command either from the operator interface or from the control centre for this purpose. In this case, no protocol conversion takes place at all. This can, for example, be the case if the operator interface is compatible with the currently operated back end system, so that a protocol conversion is not necessary. The interface device is therefore multifunctional and can if required function as a protocol converter and in other cases just direct the commands through without changing the signals.

According to one embodiment, it is proposed that the interface device is capable to be updated. This means that the interface device can support various protocols, for example by means of altered firmware, wherein in each case a first and/or a second protocol can be stored in a memory of the interface device. By corresponding configuration of the memory, the interface device can be adapted to various operator interfaces and back end systems.

According to one embodiment, it is proposed that the interface device has a wireless interface. The interface device can enter into wireless communication with the control centre via the wireless interface. This can be particularly advantageous if the communication module of the charging station only supports wired communication. Therefore, by installing the interface device an additional functionality of the charging station is provided, in particular for wireless communication with a control centre. The wireless interface is suitable for communication via a mobile communications network, preferably a cellular mobile communications network. Another wireless communications network can also be supported, for example communication via WLAN or suchlike. Therefore, communication between charging station and control centre is always assured by means of the wireless interface in the interface device, without a corresponding cable having to be installed.

It is also proposed that the interface device is designed to receive an identification module for a wireless communications network. In particular, the communication module is suitable for performing an identification within a communications network. The communications network is preferably a cellular mobile communications network. The identification module is preferably a Subscriber Identity Module (SIM), as is usually used in mobile communications networks. This identification module also enables encrypted communication to take place between the interface device and the control centre. In addition, it is possible for a closed user group to be directly communicated with in the mobile communications network by means of the identification module, in particular within the framework of a so-called Virtual Private Network (VPN). Here, the communication between the interface device and the control centre can be established via a so-called VPN tunnel, so that the communication can be carried out securely via an otherwise public communications network.

In particular, measurement data from a consumption meter can be transmitted by the interface device to the control centre. Particularly this communication is preferably carried out securely, in order to prevent manipulation of measurement data for measured consumption amounts.

According to one exemplary embodiment, it is proposed that the interface device is designed in such a way that it communicates with the operator interface via the Open Charge Point Protocol (OCPP). This OCPP protocol defines in basic features how communication has to look at an operator interface. However, it has been recognised that the OCCP protocol is possible in various implementations with partly different commands and different command timings, so that different sets of protocol parameters for the OCCP protocols can be stored in the operator interface device. Different implementations of the OCCP protocol can hereby be supported by the interface device.

On the other hand, the interface device can communicate with the control centre via an operator-specific protocol, for example the LG2WAN protocol of the applicant. In particular, the operator-specific protocol is such that it is permissible with regard to calibration regulations and enables a full authentication, authorisation and/or encryption to be carried out with regard to the transfer of measurement data. This is not mandatory, for example, with the protocol operated on the operator interface. Therefore, the interface device can guarantee the transfer of measurement data which is not enabled, for example, with the protocol on the operator interface.

According to one embodiment, it is proposed that the operator interface is communicated with via an operator-specific protocol and that the interface device communicates with the control centre via the Open Charge Point Protocol. The interface device can therefore be designed in such a way that it can, for example, communicate with an operator-specific protocol via the operator interface. The OCPP protocol can be implemented on the side of the interface device directed towards the control centre to support a variety of operators, wherein a variety of forms are also possible here and sets of parameters for the respective forms of the OCPP protocol can be stored in the interface device.

According to one embodiment, it is proposed that the chronological order of incoming commands in relation to outgoing commands is varied by the interface device. For this purpose, the interface device is designed such that it has a command memory which firstly temporarily stores incoming commands. Then, it can be decided in the interface device, depending on the supported protocol, whether a chronologically succeeding incoming command is sent before a previously arrived command. This temporal conversion of the communicated commands is possible in both directions. In particular, commands received by the operator interface of the communication module can be changed with respect to their chronological order and can be sent in changed chronological order to the control centre or vice versa.

According to one embodiment, it is proposed that the interface device has a connection to a payment terminal. By means of such a connection for a payment terminal the interface device provides a further functionality which is not necessarily the case in a charging station. This connection enables a payment process to be directly produced within the charging station by connecting a payment terminal to the charging station via the interface device. Various protocols can also be implemented here in the interface device, for example, for communicating between the interface device and a payment terminal device, in particular the EP2 protocol, the ZFT protocol, the ISO 8583 protocol or the APACS protocol. The ZVT protocol, the OPI protocol or the MDB protocol can also be implemented.

A payment process can be triggered and completed within the charging station by means of the connection for a payment terminal, which on successful completion can initiate a charging process. For this reason, the interface device can receive a payment signal via the connection from the payment terminal. If the interface device receives a payment signal, a charge connection from the control centre can be requested or negotiated by the interface device and, where appropriate, following a charge connection from the control centre, the enabling signal can be transmitted by the interface device to the operator interface.

A further aspect is an interface device having a first connection arranged for communication with an operator interface of a communication module of a charging station arranged for communication with a control centre external to the charging station, wherein a first protocol is implemented in the operator interface, and having a second connection designed for communication with the external control centre via a second protocol which is different from the first protocol. The previous explanations also, of course, all apply for the interface device, to the extent to which they may be applicable.

A further aspect is a method for operating a charging station, in which a charging process of an electric vehicle is controlled at the charging station, wherein charge control commands are exchanged with a charge control interface of a communication module to control the charging process and charge control commands are received by the communication module at an operator interface in a first protocol. Interoperability of the charging station with different back end systems or vice versa is ensured by the fact that the charge control commands of the operator interface are exchanged with an interface device arranged in the charging station in the first protocol and by the fact that charge control commands are exchanged by the interface device with an external control centre in a second protocol which is different from the first protocol. The commands are converted in the interface device from the first protocol into the second protocol and from the second protocol into the first protocol. The previous explanations also, of course, all apply for the method, to the extent to which they may be applicable.

BRIEF DESCRIPTION OF THE SEVERAL VIEWS OF THE DRAWING

The subject matter is explained in more detail below with the reference to the figures illustrating embodiments.

FIG. 5 shows a memory with sets of protocol parameters according to an exemplary embodiment.

DETAILED DESCRIPTION OF THE INVENTION

Figure 1:
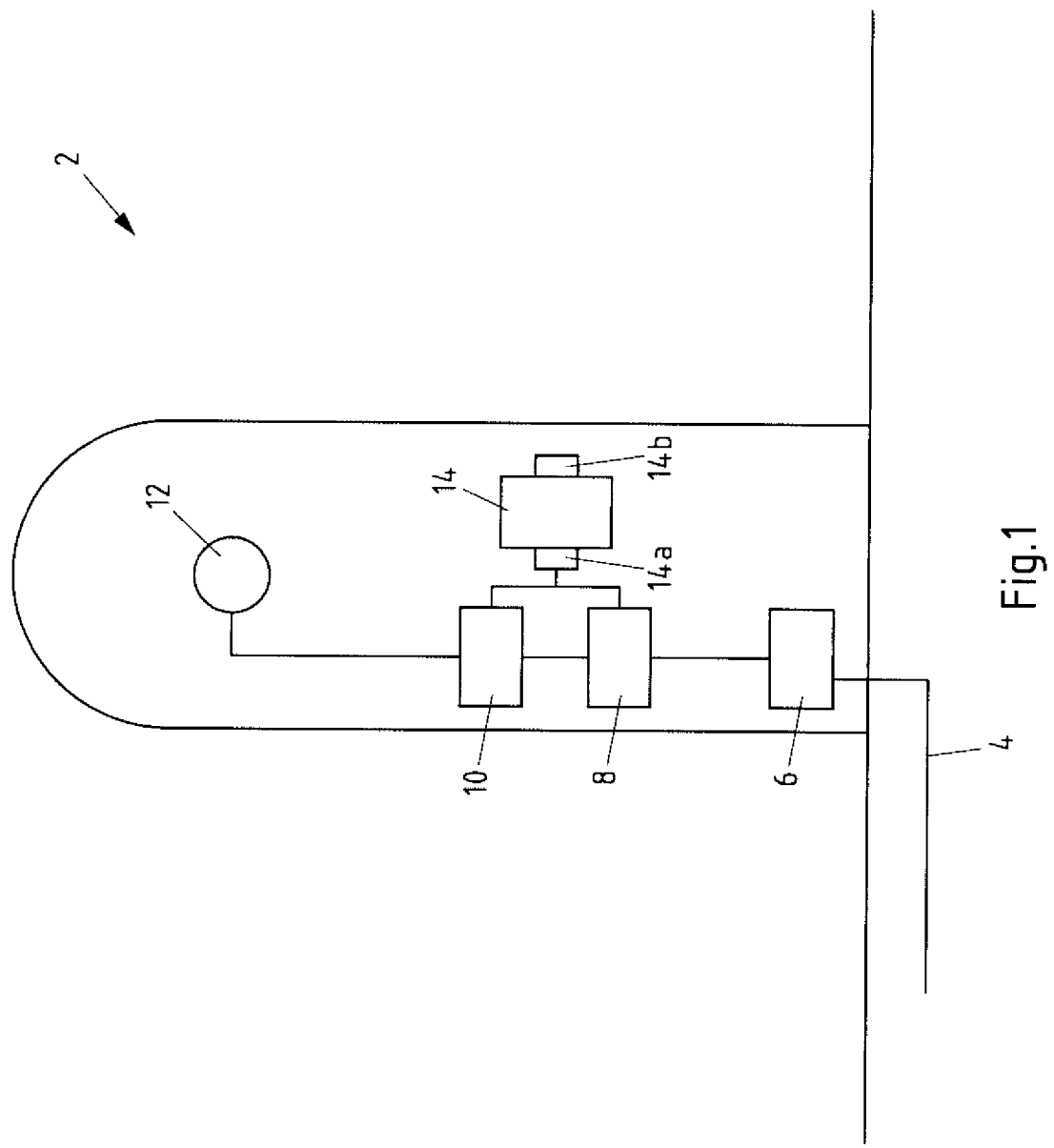
FIG. 1 shows a charging station.

FIG. 1 shows a charging station 2 according to an embodiment. The charging station 2 has a connection to an energy supply network 4. An energy meter 8 is connected via a suitable safety fuse 6 to the energy supply network 4 within the charging station 2. The meter 8 measures the electric energy output by a charge controller 10 via a connection 12 to a consumer. An electric vehicle (not illustrated) can be connected by cable to the connection 12. Following the connection, the charge controller 10 communicates with a charge controller (connected by cable or cable-free) built into the electric vehicle and negotiates charge parameters. The negotiated charge parameters are then correspondingly set and the charging station 2 provides the electric vehicle with electric energy from the energy supply network 4. The energy provided is measured by the meter 8.

Both when negotiating the charge parameters and when releasing the charging current, the charge controller 10 additionally communicates with a communication module 14 which has a charge controller interface 14a and an operator interface 14b.

In addition, the communication module 14 receives measurement data from the meter 8 via the charge controller interface 14a or another interface. The communication module 14 communicates with a control centre (not illustrated) via the operator interface 14b. In particular, the operator interface 14b can be a wired network interface, for example a LAN interface. A DSL splitter, which is connected to a wide area network, can, for example, be connected to the communication module 14 via such an interface.

The process of charging an electric vehicle is sufficiently known and for this reason is not specified here.

Figure 2:
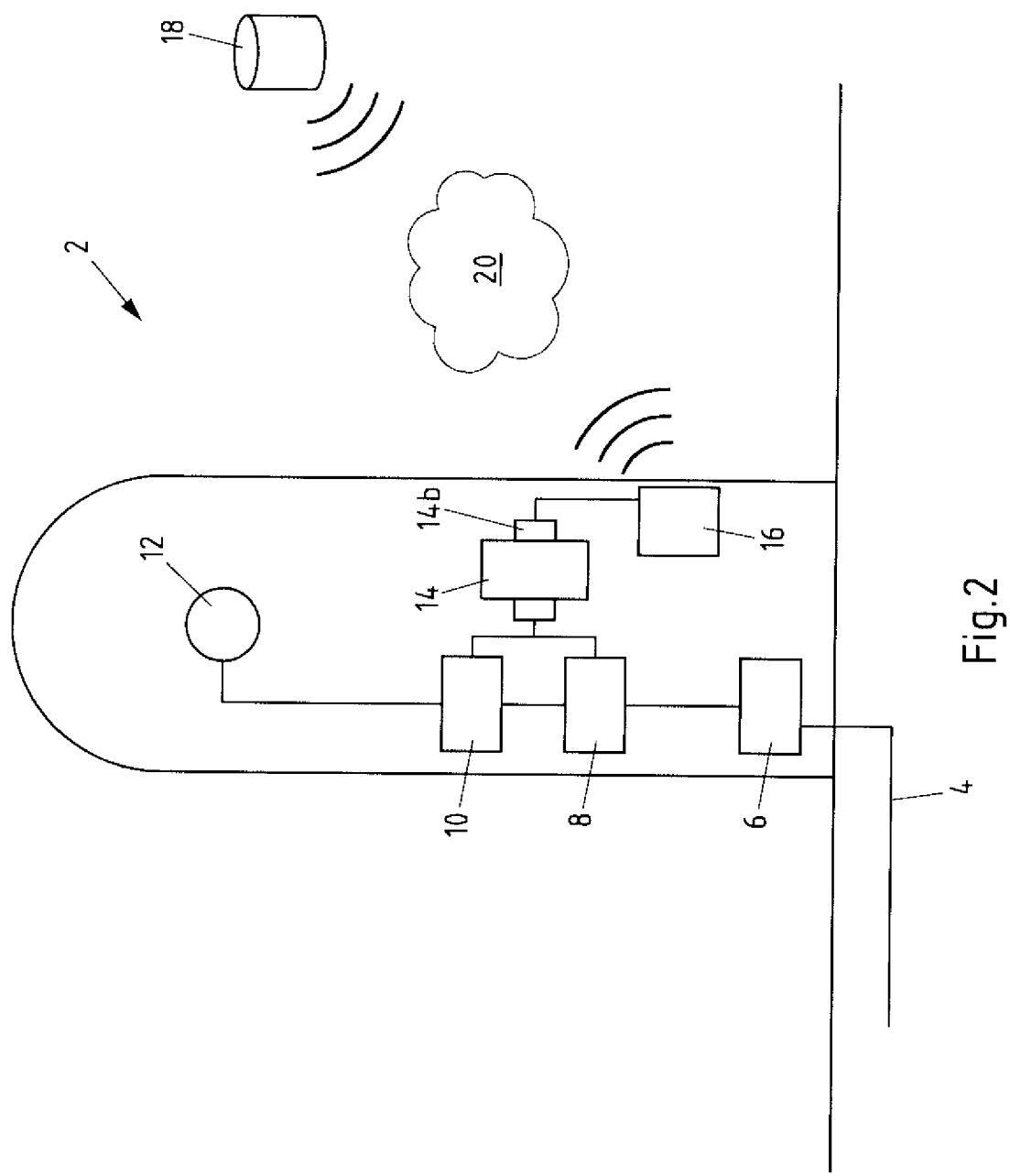
FIG. 2 shows a charging station according to an exemplary embodiment.

FIG. 2 shows a charging station 2 constructed according to FIG. 1 having a communication module 14 which is connected via the charge controller interface 14a to the charge controller 10 and the meter 8 and also has the operator interface 14b.

As a supplement to the charging station 2 according to FIG. 1, the charging station 2 according to FIG. 2 has an additional interface device 16. The interface device 16 is connected to the operator interface 14b of the communication module 14. The interface device 16 exchanges charge control commands with the communication module 14 via the operator interface 14b. This communication can be bidirectional. The operator interface 14b is implemented in such a way that it operates with an operator-specific protocol. The commands therefore correspond to the operator-specific protocol.

The interface device has means to independently determine the protocol operated by the operator interface 14. This can, for example, be by evaluating data telegrams which the interface device receives from the operator interface 14b. It is also possible that it is prespecified in the interface device 16 which protocol the operator interface 14 supports.

In accordance with the protocol of the operator interface 14b a set of protocol parameters can be addressed in the interface device 16, with which a conversion into a second protocol takes place which was agreed with a control centre 18.

Commands which are received from the control centre 18 and commands which are transmitted to the control centre 18 can be defined according to a second protocol. By means of the set of protocol parameters, the commands in the second protocol can be converted into the commands which the operator interface 14b understands and vice versa.

A wireless interface is provided in the interface device 16, by means of which wireless communication with a control centre 18 is possible via a wide area network 20.

Figure 3:
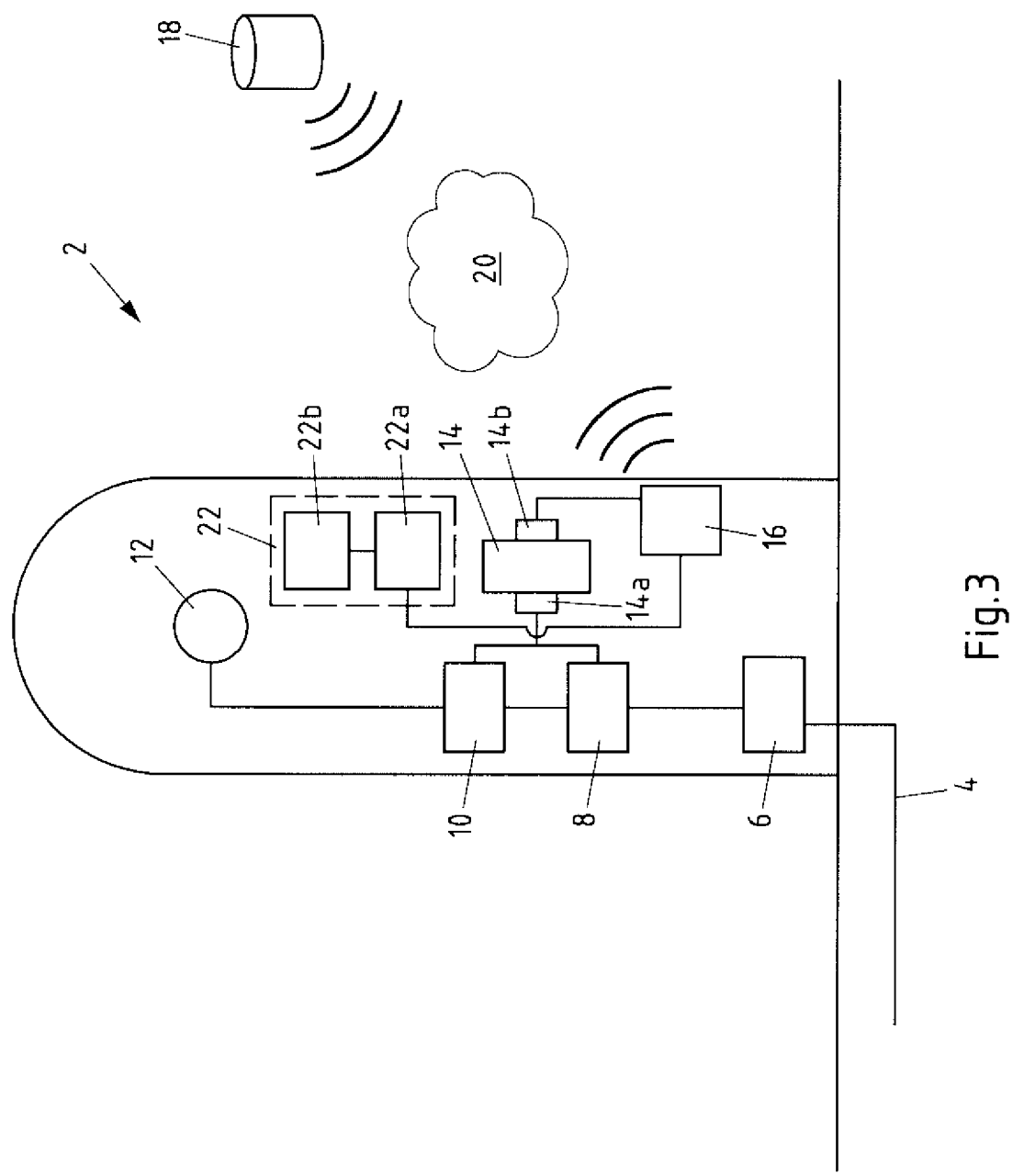
FIG. 3 shows a charging station according to an exemplary embodiment.

FIG. 3 shows a charging station 2 in the sense of FIG. 2. In addition to the connection of the interface device 16 to the operator interface 14b, the interface device 16 has a connection for a payment terminal 22. A payment terminal 22 can consist of a cryptoprocessor 22a and a user interface 22b. A payment process, for example using a credit card or a debit card, can be carried out via the payment terminal 22. For this purpose, the card number or other card data and a personal identification number of the user can be requested via the user interface. The allowability of the transaction can be checked in the crypto chip 22a and when the transaction is successful the crypto chip 22a can transmit a payment signal to the interface device 16.

On receipt of such information, the interface device 16 mediating between the control centre 18 and the communication module 14 can initiate a charging process. In particular, the duration of a charging process, the extent of a charging process and the charging process itself, i.e. its start and end, can be established by the interface device 16 corresponding to the information from the crypto chip 22a or the payment signal. The communication between the control centre 18 and the communication module 14 is adapted by the interface device 16 corresponding to the prespecified protocols.

Figure 4:
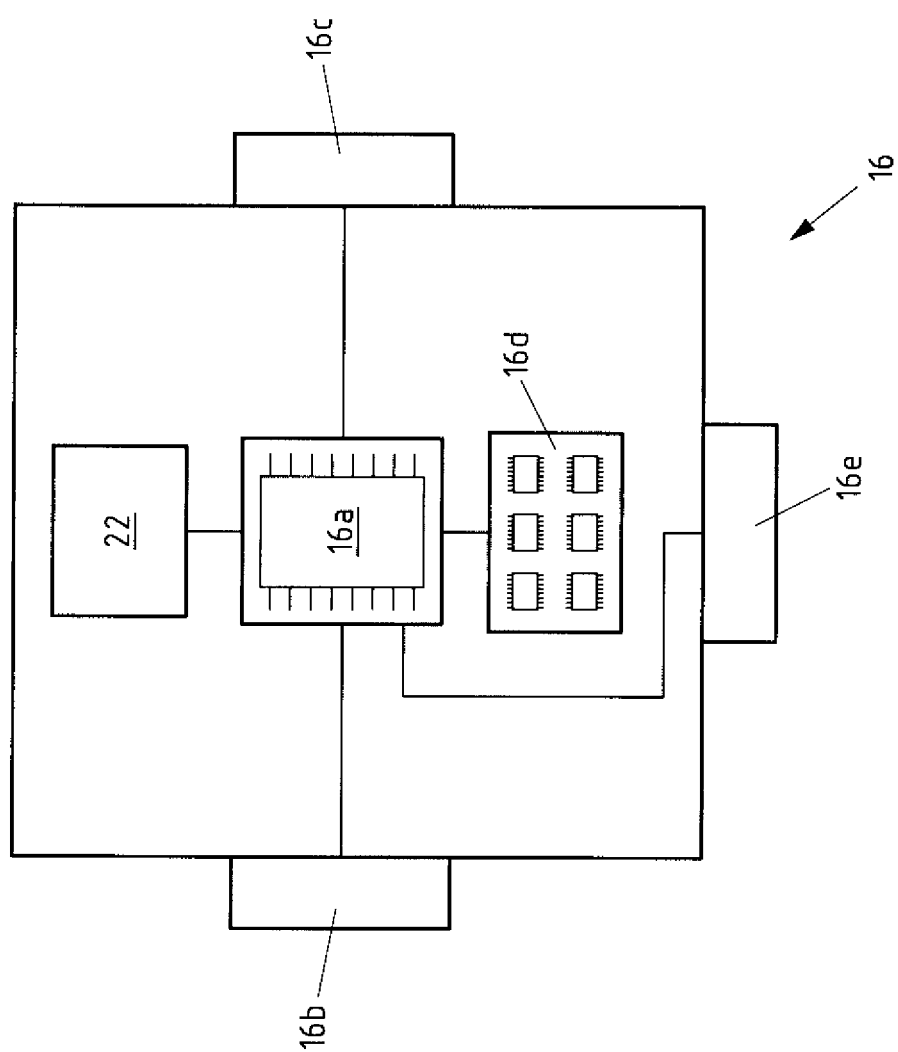
FIG. 4 shows an interface device according to an exemplary embodiment.

An interface device 16 is illustrated in FIG. 4. The interface device 16 has a microprocessor 16a which provides the functionality of the interface device 16.

The microprocessor 16a is connected to the interfaces 16b and 16c. The interface 16b operates in a first protocol in order to communicate with the operator interface 14b. The interface 16c operates in a second protocol in order to communicate with the control centre 18. The signals exchanged between the interfaces 16b and 16c are converted by the microprocessor 16a in relation to their protocol. For this purpose, the microprocessor 16a can in particular access a memory 16d, in which sets of protocol parameters are stored.

The interface 16c is preferably a wireless interface which makes communication with a mobile communications network possible. For this communication, an authentication and authorisation is required in the mobile communications network, which is enabled via a Subscriber Identity Module (SIM) 24 arranged in the interface device 16. User data, crypto data, access data and suchlike can be stored on this SIM 16 [sic: 24?], by means of which the microprocessor 16a can establish communication with the mobile communications network via the interface 16c.

In addition to the interfaces 16b and 16c, the interface device 16 has a connection 16e to the connection to a payment terminal 22. The communication between the payment terminal 22 and the interface device 16 is also controlled by the microprocessor 16a, wherein a memory (not illustrated) with different protocol parameters can also be accessed here, in order to support a variety of protocols for a variety of payment terminals.

Figure 5:
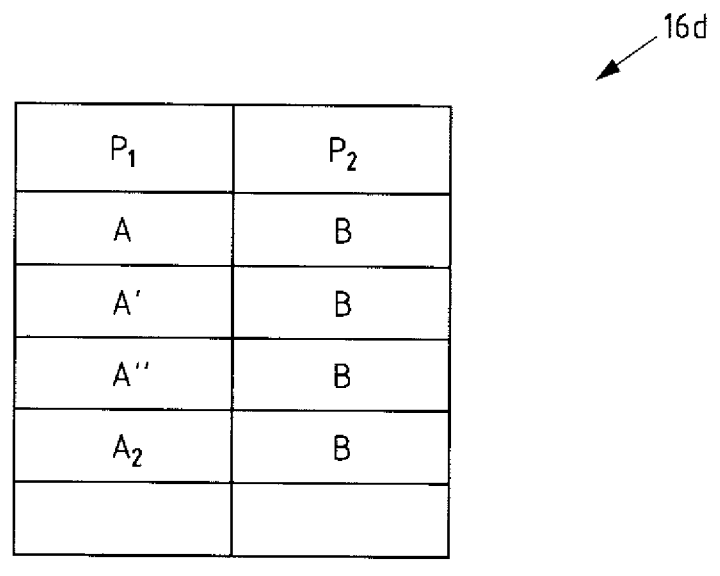

FIG. 5 shows a memory 16d with different protocol parameter sets. Firstly, columns P1 and P2 are respectively provided for the two protocols to be supported. Protocol P1 serves, for example, for the communication with the operator interface 14b and protocol P2 serves for the communication with the control centre 18.

It is conceivable for different operator interfaces 14b to be implemented using the OCPP protocol in each case, wherein the OCCP protocol can where appropriate be implemented in different forms. The different forms of the OCCP protocol are illustrated in FIG. 5 by the protocol parameter sets A, A', A". Therefore, for an identical protocol a plurality of protocol parameter sets are stored in the memory 16d. It can be seen that for each stored protocol parameter set A, A', A" a corresponding respective protocol parameter set B is stored respectively, with which the signals in one of the protocols A, A', A" are converted into signals in a protocol B for the control centre 18. On the output side, i.e. on the communication link between the control centre 18 and the interface device 16, at all times the same protocol is implemented by a protocol parameter set B, whereas on the input side a variety of protocol parameter sets A, A', A" can be stored for a protocol.

It is also shown that an additional protocol $A_2$ can be supported which can be different from the OPPC protocol. This protocol can also be converted into a protocol according to the protocol parameter set B for communication with the control centre 18.

Further memory locations can also be provided in the memory 16*d*, in order make further implementation of other or similar protocols possible.

As already explained at the outset, a protocol conversion can also be such that different protocol parameter sets B are provided, so that a variety of operators with different protocols are also supported. A variety of protocols can also be subsequently supported by means of a firmware update or an updating of rows in the memory 16*d*.

By means of the charging station according to the subject matter of the invention and the method according to the subject matter of the invention, as well as the interface according to the subject matter of the invention, it is possible to increase the interoperability between different control centres and different charging stations.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any nonclaimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A charging station for electric vehicles comprising:
a charge control circuit arranged to control a charging process of an electric vehicle at the charging station,
a communication module having a charge control interface arranged for communication with the charge control circuit and an operator interface arranged for communication with a control centre external to the charging station, wherein a first protocol is implemented in the operator interface for communication with the control centre,
wherein an interface device arranged at the operator interface is provided in the charging station, the interface device communicating with the operator interface by means of the first protocol and with the external control centre by means of a second protocol which is different from the first protocol.

2. The charging station of claim 1, wherein the interface device has at least two sets of protocol parameters such that one of different second and/or first protocols is assigned to each set of protocol parameters.

3. The charging station of claim 2, wherein the interface device is arranged to receive a set of protocol parameters, in particular from the control centre.

4. The charging station of claim 1, wherein the interface device has a memory of a first and/or of a second protocol, wherein the memory can be configured in particular by the control centre.

5. The charging station of claim 1, wherein
the interface device has a wireless interface, wherein the wireless interface is designed for wireless communication with the control centre, in particular via a cellular mobile communications network, and/or in that
the interface device is arranged to receive an identification module for a wireless communications network, in particular a cellular mobile communications network, and/or in that
the interface device is arranged for secure communication of measurement data from a consumption meter to the control centre.

6. The charging station of claim 1, wherein
the interface device communicates with the operator interface via the Open Charge Point Protocol (OCPP), and in that the interface device communicates with the control centre via an operator-specific protocol, or in that
the interface device communicates with the operator interface via an operator-specific protocol, and in that the interface device communicates with the control centre via the Open Charge Point Protocol (OCPP).

7. The charging station of claim 1, wherein a chronological order of incoming commands in relation to outgoing commands varies in the interface device.

8. The charging station of claim 1, wherein the interface device has a connection to a payment terminal, in particular in that the payment terminal communicates with the connection via at least one of the protocols ep2, ZVT, ISO8583 or APACS.

9. The charging station of claim 8, wherein the interface device receives a payment signal from the payment terminal, in that the interface device negotiates a charge disconnection with the control centre, and in that the interface device subsequently exchanges a release signal with the operator interface.

10. An interface device comprising:
a first connection arranged for communication with an operator interface of a communication module of a charging station arranged for communication with a control centre external to the charging station, wherein a first protocol is implemented in the operator interface, a second connection arranged for communication with the external control centre via a second protocol which is different from the first protocol.

11. A method for operating a charging station, comprising:

a charging process of an electric vehicle is controlled at the charging station, wherein charge control commands are exchanged with a charge control interface of a communication module to control the charging process and charge control commands are received by the communication module at an operator interface in a first protocol, wherein the charge control commands of the operator interface are exchanged with an interface device arranged in the charging station in the first protocol, and in that charge control commands are exchanged by the interface device with an external control centre in a second protocol which is different from the first protocol.

* * * * *